(12) United States Patent
Henkin et al.

(10) Patent No.: US 9,195,774 B2
(45) Date of Patent: Nov. 24, 2015

(54) METHODS AND SYSTEMS FOR AUGMENTING CONTENT DISPLAYED ON A MOBILE DEVICE

(75) Inventors: Assaf Henkin, Tel Aviv (IL); Yoav Shaham, Ramat Hasharon (IL); Itai Brickner, Tel Aviv (IL); Stanislav Krichevsky, Petah Tiqwa (IL)

(73) Assignee: Kontera Technologies, Inc., Foster City, CA (US)

( * ) Notice: Subject to any disclaimer, the term of this patent is extended or adjusted under 35 U.S.C. 154(b) by 0 days.

(21) Appl. No.: 13/236,164

(22) Filed: Sep. 19, 2011

(65) Prior Publication Data

US 2012/0072547 A1 Mar. 22, 2012

Related U.S. Application Data (60) Provisional application No. 61/383,898, filed on Sep. 17, 2010.

(51) Int. Cl.
*G06F 15/16* (2006.01)
*G06F 17/30* (2006.01)

(52) U.S. Cl.
CPC .................... *G06F 17/30902* (2013.01)

(58) Field of Classification Search
CPC ............... G06F 17/30899; G06F 2203/04809; G06F 2203/04804; G06F 3/0481; G09G 2340/10
USPC ........................... 709/246, 219; 715/739, 768
See application file for complete search history.

(56) References Cited

U.S. PATENT DOCUMENTS

| 6,272,493 | B1 * | 8/2001 | Pasquali ..................... 709/219 |
| 6,373,502 | B1 * | 4/2002 | Nielsen ...................... 715/708 |
| 7,100,123 | B1 * | 8/2006 | Todd et al. .................. 715/862 |
| 8,468,562 | B2 * | 6/2013 | Miller et al. ................. 725/32 |
| 8,788,932 | B1 * | 7/2014 | Phuah et al. ................. 715/234 |
| 8,824,274 | B1 * | 9/2014 | Medved et al. ............. 370/217 |
| 2002/0052928 | A1 * | 5/2002 | Stern et al. .................. 709/218 |
| 2002/0101431 | A1 * | 8/2002 | Forney et al. ................ 345/582 |
| 2004/0122730 | A1 * | 6/2004 | Tucciarone et al. .......... 705/14 |
| 2004/0125149 | A1 * | 7/2004 | Lapidous ..................... 345/808 |
| 2005/0183031 | A1 * | 8/2005 | Onslow ....................... 715/805 |
| 2005/0283798 | A1 * | 12/2005 | Hunleth et al. .............. 725/37 |
| 2006/0059432 | A1 * | 3/2006 | Bells ........................... 715/768 |
| 2010/0057566 | A1 * | 3/2010 | Itzhak ....................... 705/14.53 |
| 2010/0083191 | A1 * | 4/2010 | Marshall .................... 715/863 |
| 2010/0107123 | A1 * | 4/2010 | Sareen et al. ............... 715/835 |
| 2010/0205530 | A1 * | 8/2010 | Butin et al. ................. 715/715 |
| 2011/0145718 | A1 * | 6/2011 | Ketola et al. ............... 715/739 |
| 2011/0153508 | A1 * | 6/2011 | Jhunjhunwala ............. 705/306 |
| 2011/0210922 | A1 * | 9/2011 | Griffin ........................ 345/173 |
| 2011/0321082 | A1 * | 12/2011 | Weerasinghe ............... 725/31 |

(Continued)

FOREIGN PATENT DOCUMENTS

WO WO 2007/123783 * 7/2007 ............ G06Q 10/00

*Primary Examiner* — Anthony Mejia
(74) *Attorney, Agent, or Firm* — Schwegman Lundberg & Woessner, P.A.

(57) ABSTRACT

Techniques for enhancing web content presented with a mobile application are described. Consistent with some embodiments, a contextual content server communicates to a mobile application executing at a mobile computing device, content modification instructions. The content modifications instructions direct the mobile computing device to present modified, or additional, content, generally selected for its relevance to some original content being presented by an application executing at the mobile computing device.

3 Claims, 13 Drawing Sheets

(56) References Cited

U.S. PATENT DOCUMENTS

2012/0167047 A1* 6/2012 Wyler et al. .................. 717/122
2013/0054672 A1* 2/2013 Stilling et al. ................ 709/202
2013/0086153 A1* 4/2013 Vendrow ...................... 709/203
2015/0161177 A1* 6/2015 Singh et al. .................. 707/722

* cited by examiner

METHODS AND SYSTEMS FOR AUGMENTING CONTENT DISPLAYED ON A MOBILE DEVICE

CLAIM OF PRIORITY

This patent application claims the benefit of priority, under 35 U.S.C. §119(e), to U.S. Provisional Patent Application Ser. No. 61/383,898, entitled "METHODS AND SYSTEMS FOR AUGMENTING CONTENT DISPLAYED ON A MOBILE DEVICE," filed on Sep. 17, 2010, which is hereby incorporated by reference herein in its entirety.

TECHNICAL FIELD

The present disclosure generally relates to methods and systems for augmenting content displayed on a mobile device. More specifically, the present disclosure relates to methods and systems for selecting content, based on an analysis of other (primary) content displayed on a mobile device, and then augmenting the primary content by enabling the presentation and display of the selected content.

BACKGROUND

Sales of mobile computing devices, including mobile phones (e.g., smart phones) and tablet computers with touch screen displays, are expected to outpace sales of personal computers going forward. Accordingly, content publishers are increasingly developing and publishing content specifically suited to the sometimes more limited resources and smaller display sizes of these mobile computing devices.

DESCRIPTION OF THE DRAWINGS

Some embodiments are illustrated by way of example and not limitation in the figures of the accompanying drawings, in which.

DETAILED DESCRIPTION

Methods and systems for augmenting content displayed on a mobile computing device are described. In the following description, for purposes of explanation, numerous specific details are set forth in order to provide a thorough understanding of the various aspects of different embodiments of the present invention. It will be evident, however, to one skilled in the art, that the present invention may be practiced without these specific details.

In general, the present disclosure relates to methods and systems for selecting content, based on an analysis of other (primary) content displayed on a mobile device, and then augmenting the primary content by enabling the presentation and display of the selected content. For purposes of the present disclosure, the term "primary content" refers to original content prior to the augmentation of the original content. Primary content may be a web page displayed in a mobile browser application, or another application that facilitates the presentation of content, such as a news reader application, an electronic magazine (e-magazine) application, or any similar application that generally facilitates the presentation of text and graphics (e.g., images and photos) for consumption by an end-user.

For purposes of the present disclosure, the term "mobile computing device" is meant to include mobile phones (frequently referred to as smart phones) as well as other general purpose or application specific computing devices that include wireless data networking functionality, with or without voice-based phone functionality, such as certain tablet computing devices and portable media player devices. Skilled artisans will immediately recognize that certain mobile computing devices, such as iPhone®, iPod® and iPad® devices, developed by and available from Apple Corporation of Cupertino, Calif., as well as any one of a wide variety of devices based on the Android™ operating system developed by Google, Inc. of Mountain View, Calif., fall within the intended definition of a mobile computing device. A great number of other mobile computing devices, with other operating systems, will also be applicable to the inventive subject matter, which is described at length below in connection with the description of the various figures.

Figure 1:
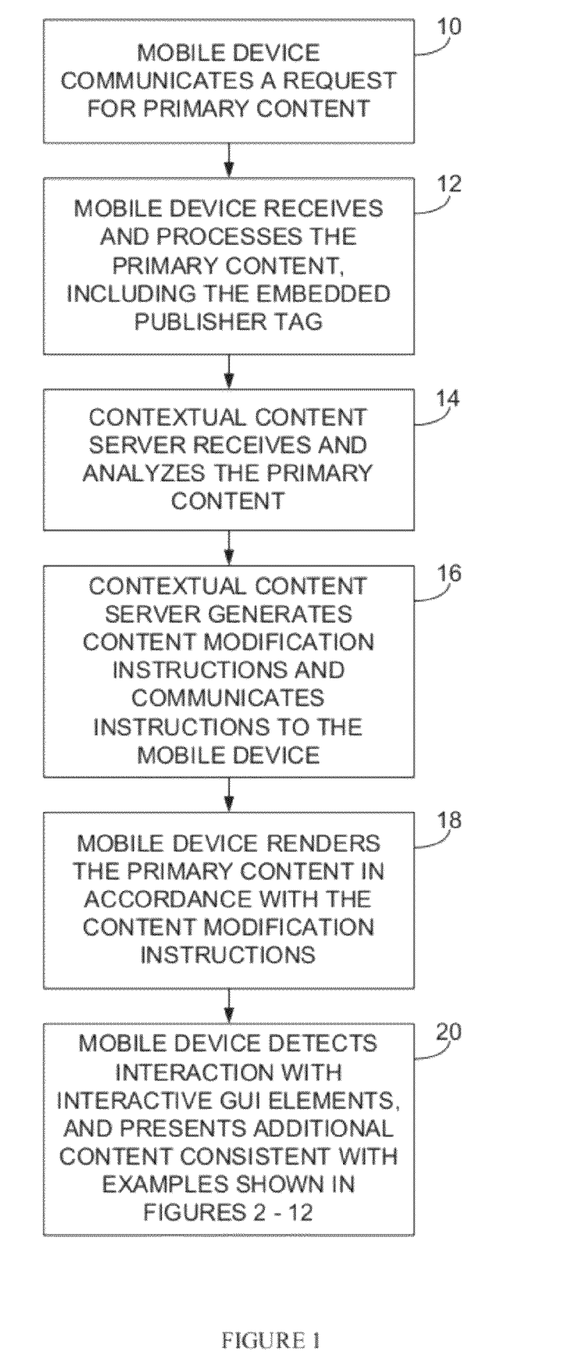
FIG. 1 illustrates a method for augmenting content presented on a mobile computing device, consistent with some embodiments.

FIG. 1 illustrates a high-level view of the various method operations that occur in a method, consistent with some embodiments, for selecting and presenting content to augment some primary content displayed via a mobile computing device. The method operations described herein may be performed in part by a server-based system, referred to herein as a contextual content server. An example of a contextual content server with which embodiments of the invention may be deployed is described in U.S. patent application Ser. No. 12/295,854 ("the '854 Application) filed on Feb. 22, 2010, and referred to therein as "a contextual analysis and response server" or a "Kontera Server System." As such, the method operations illustrated and described herein are generally consistent with those illustrated and described in FIGS. 3A, 3B, 4A, 4B, 5, 9A and 9B of the '854 Application.

At method operation 10, a mobile application residing and executing on a mobile computing device generates and communicates a request for content. The mobile application may be a conventional browser application, but could also be any application that displays textual content for consumption by an end-user. With some embodiments, the request for content may be directed and communicated directly to a content provider, whereas in other embodiments, the request may be directed to a proxy or gateway operating in conjunction with the contextual content server. In the case where the request is directed to a content provider, the content provider will analyze the request and respond by communicating some primary content to the mobile computing device. If the initial request is directed to a proxy, the proxy may analyze the request and forward the request to the intended content provider, which will process the request and reply to the proxy. At method operation 12, regardless of where the initial request is directed, the primary content is ultimately communicated to and received by the mobile computing device. The requesting application on the mobile computing device processes the received primary content, including any embedded publisher tags.

For instance, consistent with some embodiments, the primary content includes a tag (e.g., a JavaScript tag), often referred to as a "publishers tag", "ad tag", or "publisher's ad tag", which, when processed at the mobile computing device, causes portions of the primary content to be identified and communicated to the contextual content server for analysis. In some embodiments, the primary content is communicated to the contextual content server in chunks—a predetermined, fixed-size unit of data. Accordingly, at method operation 14, the contextual content server receives and analyzes the primary content for the purpose of selecting, in real time, additional content to be presented with the primary content. In some instances, an analysis of the tag will reveal that the content in which the tag was embedded has already been received and analyzed by the contextual content server. In such instances, the content need not be communicated to the contextual content server if the content has been cached, or if the results of any analysis (e.g., resulting content modification instructions) have been cached by the contextual content server.

After analyzing the primary content, at method operation 16 the contextual content server generates content modification instructions, also referred to as web page modifications instructions, which are then communicated to the mobile computing device. At method operation 18, the mobile computing device renders the primary content in accordance with the content modification instructions received from the contextual content server. For instance, the content modification instructions may indicate that certain keywords in the text of the primary content are to be rendered as hyperlinks, which, when activated, cause additional content to be displayed. Accordingly, when rendered by the mobile application, the primary content may include one or more in-line hypertext links.

With some embodiments, the additional content may be advertising content. However, the specific nature of the additional content may vary from one implementation to the next, depending in part on a wide variety of attributes. The nature and type of content that may be used to enhance the primary content is described in greater detail in the '854 Application. The manner in which the additional content is presented at the mobile computing device may generally depend on attributes or characteristics of the mobile computing device on which the content is being displayed, but will generally be consistent with the various examples presented, and described in detail, in FIGS. 2 through 12.

At method operation 20, the mobile computing device detects any interactions with various graphical user interface elements (e.g., hyperlinks, or other display "hot spots"), and presents additional content in accordance with the content modification instructions received from the contextual content server. In some instances, interaction with various UI elements will result in additional content requests being directed to the contextual content server, which will then respond with the requested content.

Figure 2:
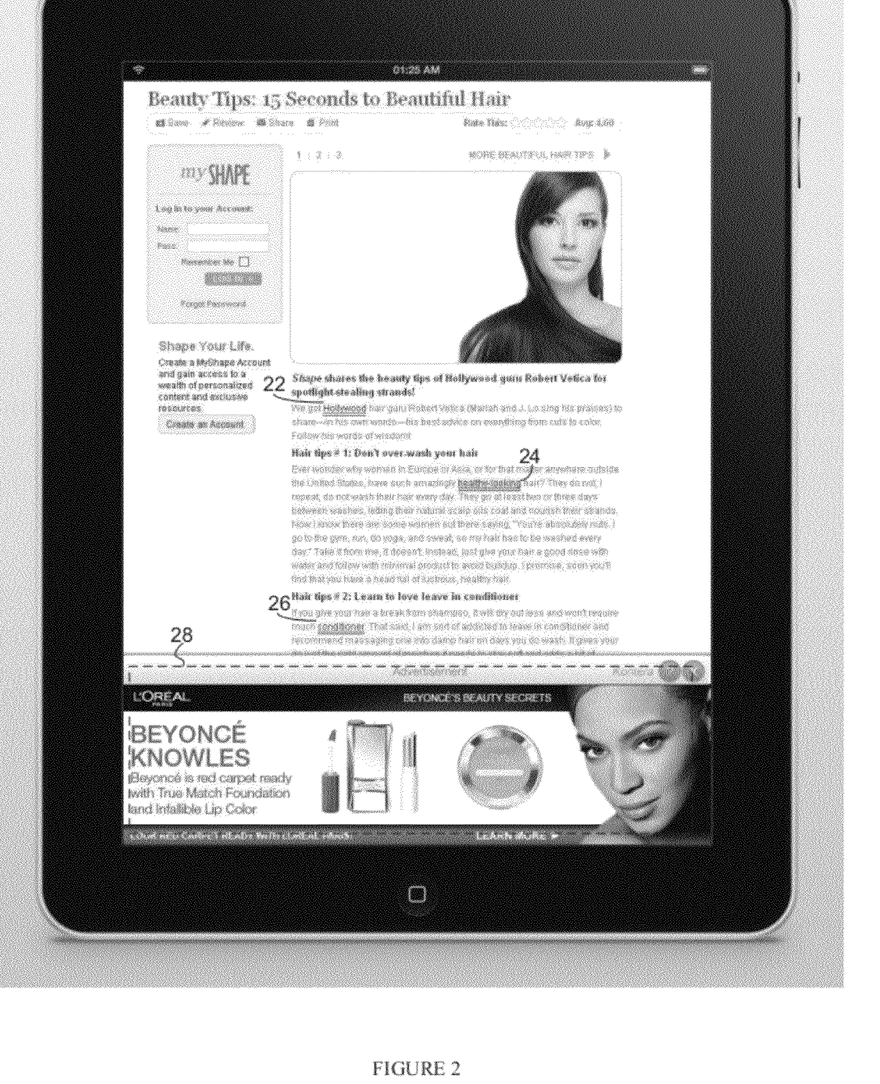
FIGS. 2 through 4 illustrate example user interfaces (UIs) for a mobile computing device (e.g., a tablet computer), such that the UIs are presenting content that has been augmented by a contextual content server with other contextually relevant content, consistent with some embodiments.
Figure 3:
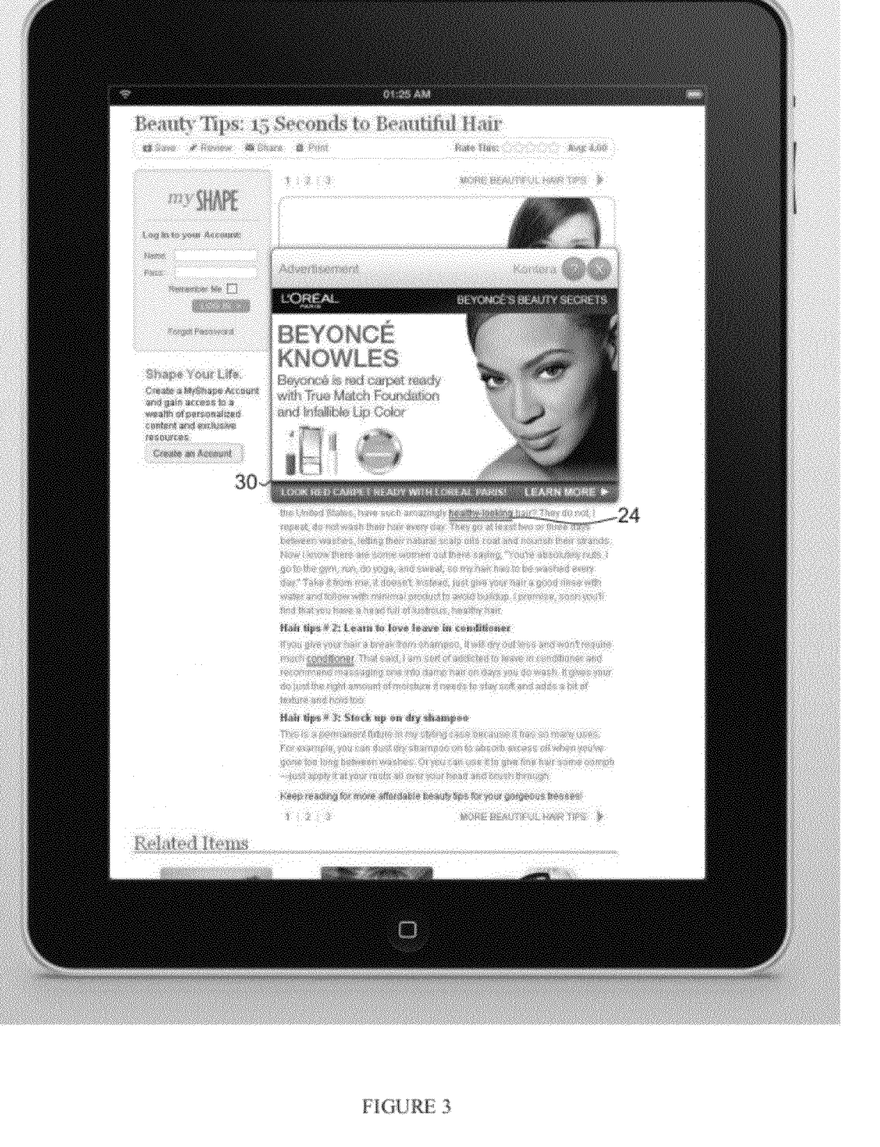
Figure 4:
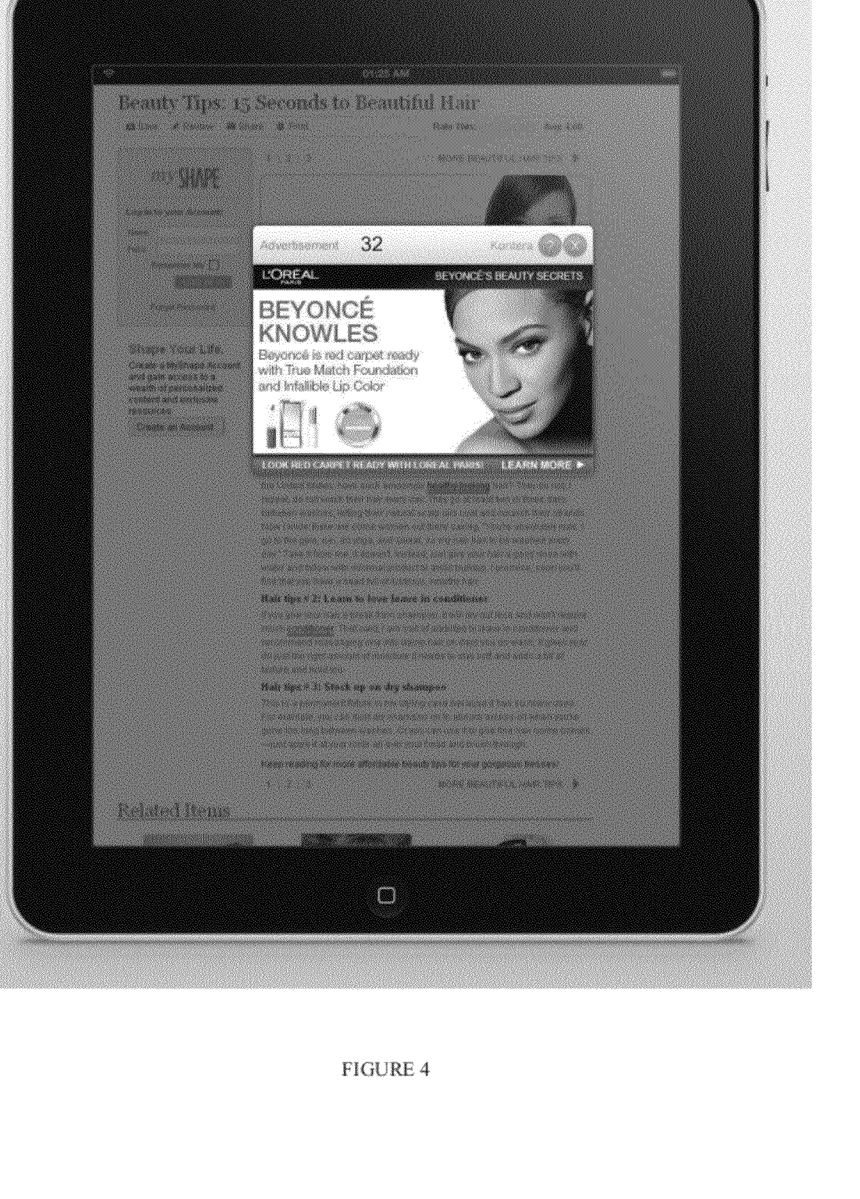
Figure 5:
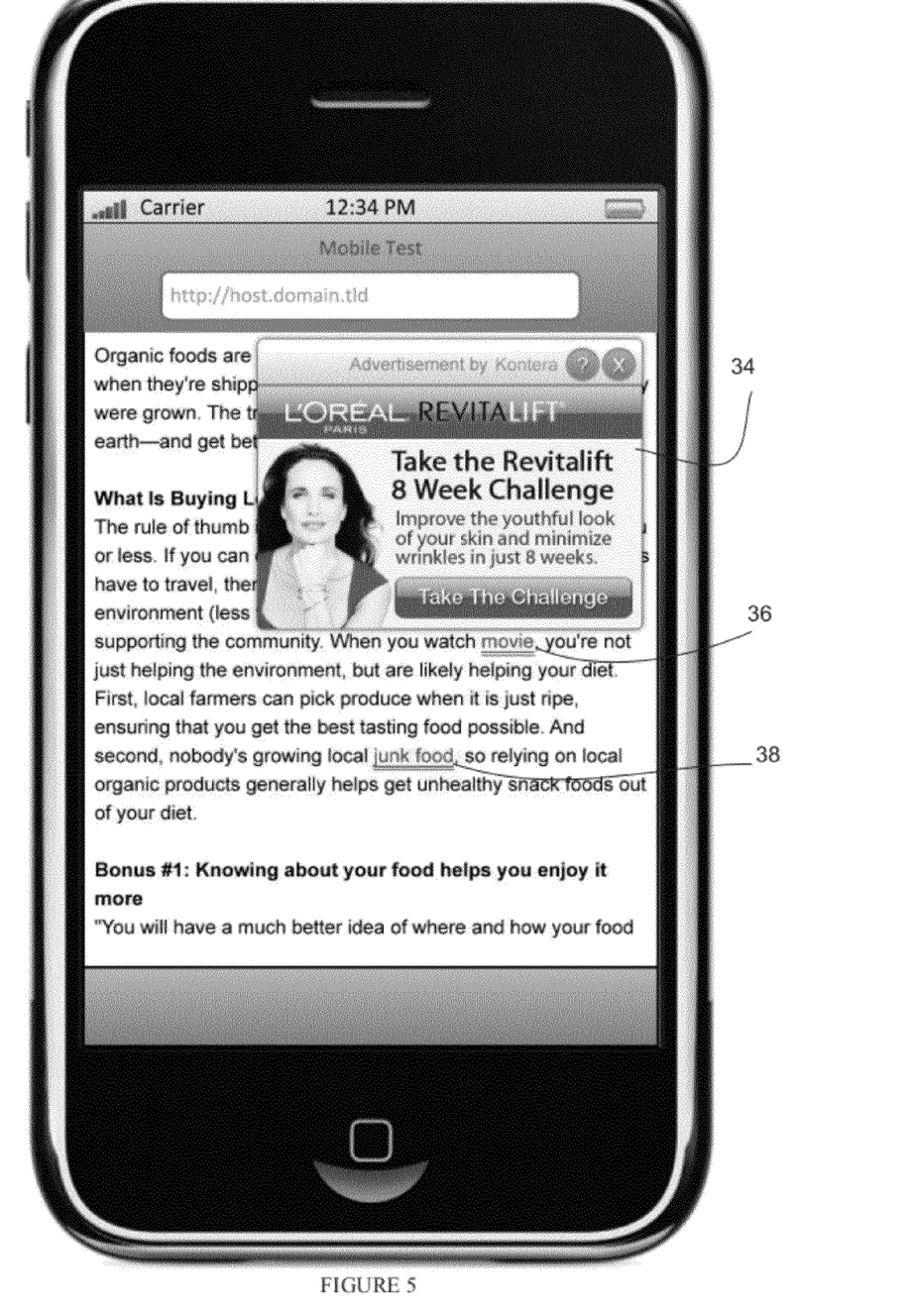
FIGS. 5 through 8 illustrate example UIs for a mobile computing device (e.g., a mobile phone), such that the UIs are presenting content that has been augmented by a contextual content server with other contextually relevant content, consistent with some embodiments.

FIGS. 2, 3, and 4 illustrate a mobile computing device (e.g., a tablet computing device) with a touch screen display that is displaying an example of content (e.g., a web page) rendered by a mobile application, such that the content has been augmented with in-line interactive hyperlinks and other additional content, consistent with some embodiments. As illustrated in FIGS. 2 through 12, these hypertext links, when tapped, will cause the mobile application to display additional content, selected by the contextual content server based on a determination that the additional content is contextually relevant to the content in which the in-line interactive links are embedded. As used herein, a "tap" is the selection or activation of a graphical user interface element via a touch screen display, typically by pressing the graphical user interface element with a finger or input apparatus, such as a stylus.

As illustrated in FIG. 2, the primary content is presented on the touch screen display of the tablet computing device. Three separate in-line hyperlinks 22, 24 and 26 have been embedded as a result of the mobile application processing content modification instructions received from the contextual content server. Accordingly, the hypertext links have been added to keywords present in the primary content, as a result of the primary content being analyzed at the contextual content server, and the contextual content server determining that the keywords represent subject matter representative of the topic that the primary content is about. As a result of tapping one of the hyperlinks, a content box 28 is being displayed in the lower portion of the display. The content box is displaying an advertisement selected for being relevant to the overall topic of the content displayed, and relating to the keyword that has been made into a hyperlink.

FIG. 3 illustrates an alternative content box that has been positioned to appear near the particular hyperlink that caused the content box to be displayed. For instance, in FIG. 3, the content box with reference number 30 is positioned next to or near the hyperlink with reference number 24 to indicate that the activation of the hyperlink 24 is what caused the content box 30 to be displayed. In some embodiments, tapping the hyperlink a first time will cause the content box 30 to be displayed, while tapping the hyperlink a second time will cause the content box to go away, or become hidden.

FIG. 4 illustrates yet another view of a content box 32 being displayed as a result of an end-user tapping a hyperlink, according to an embodiment. In FIG. 4, the primary content has been made difficult to view as a result of it being grayed out when the user tapped the hyperlink that caused the content box 32 to be displayed. This makes the end-user focus on the content box 32, as opposed to the primary content.

FIGS. 5 through 8 illustrate a mobile computing device (e.g., a mobile phone) with various examples of user interface elements showing content selected for being contextually relevant to the primary content, according to some embodiments. For example, in FIG. 5, the content box 34 is shown positioned next to or near the hyperlink with reference number 36, indicating the content box has been displayed as a result of an end-user tapping the hyperlink 36.

Figure 6:
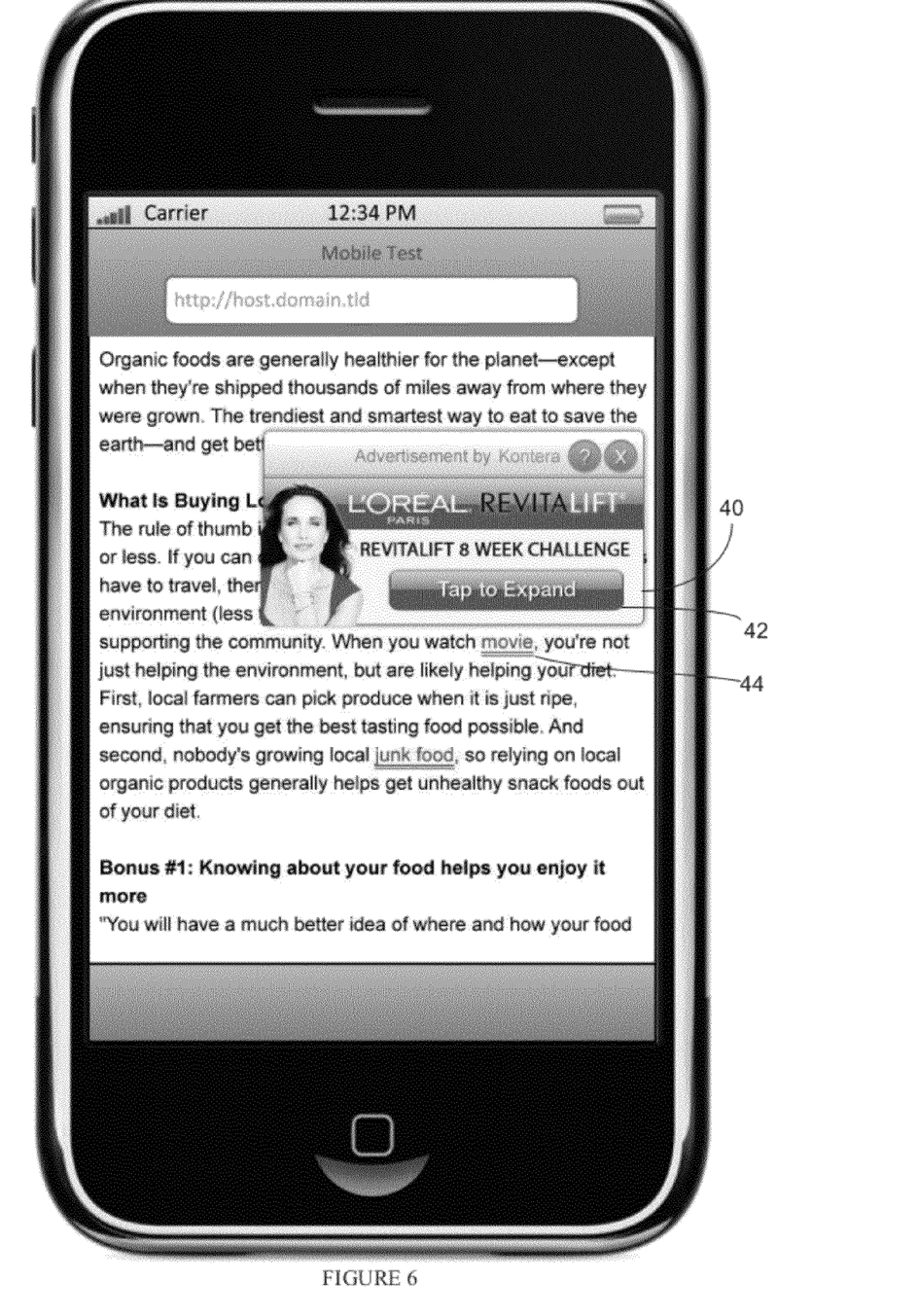
Figure 7:
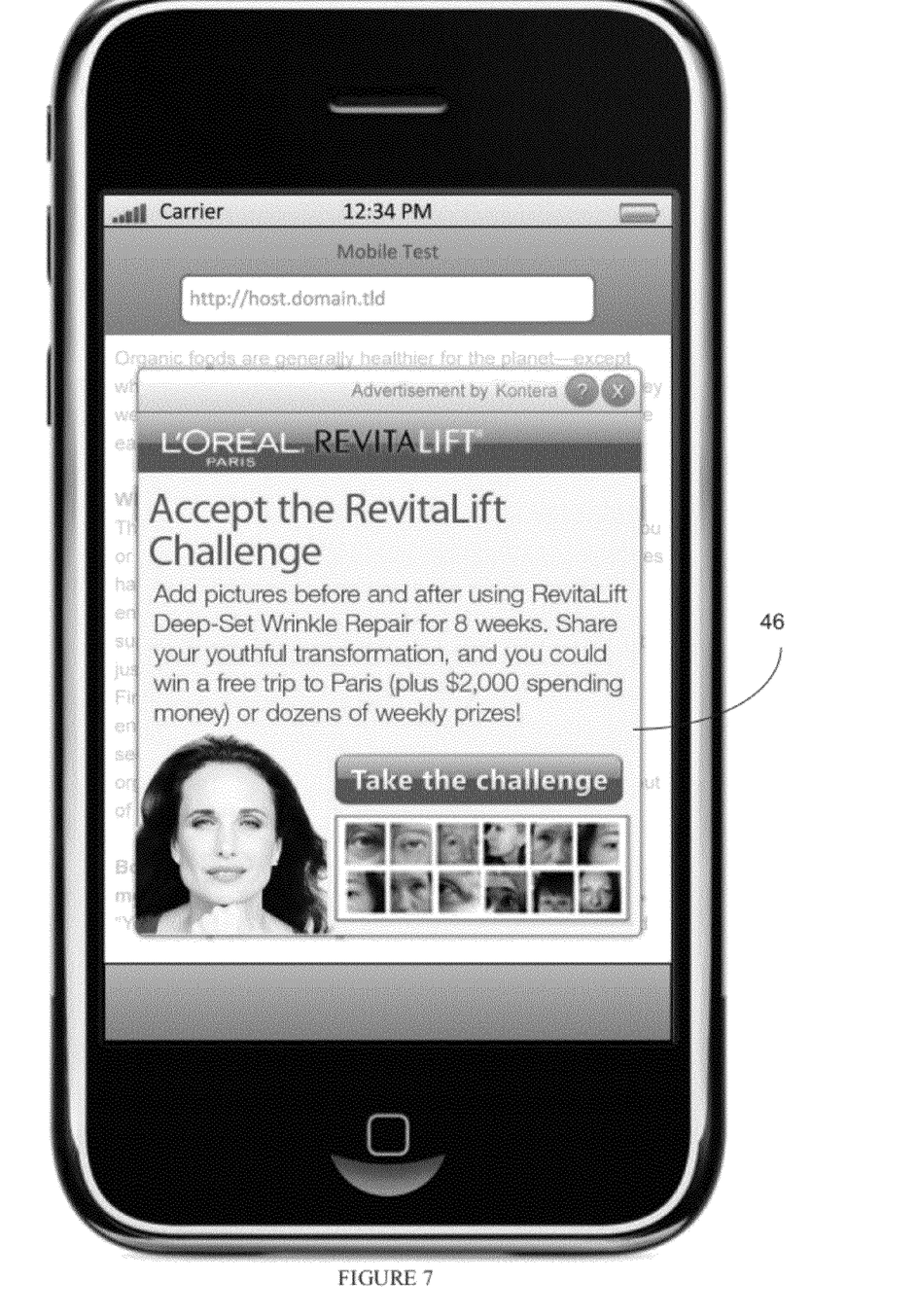

As illustrated in FIG. 6, the content box 40 includes a button 42, which, when tapped, will cause the content box to be expanded, as shown by way of example (e.g., content box 46) in FIG. 7. Accordingly, in some embodiments, the content that may be presented is dynamic. That is, the content and the way it is presented may change automatically, or as a result of a user interacting with the content in some manner, for example, by pressing a button.

Figure 8:
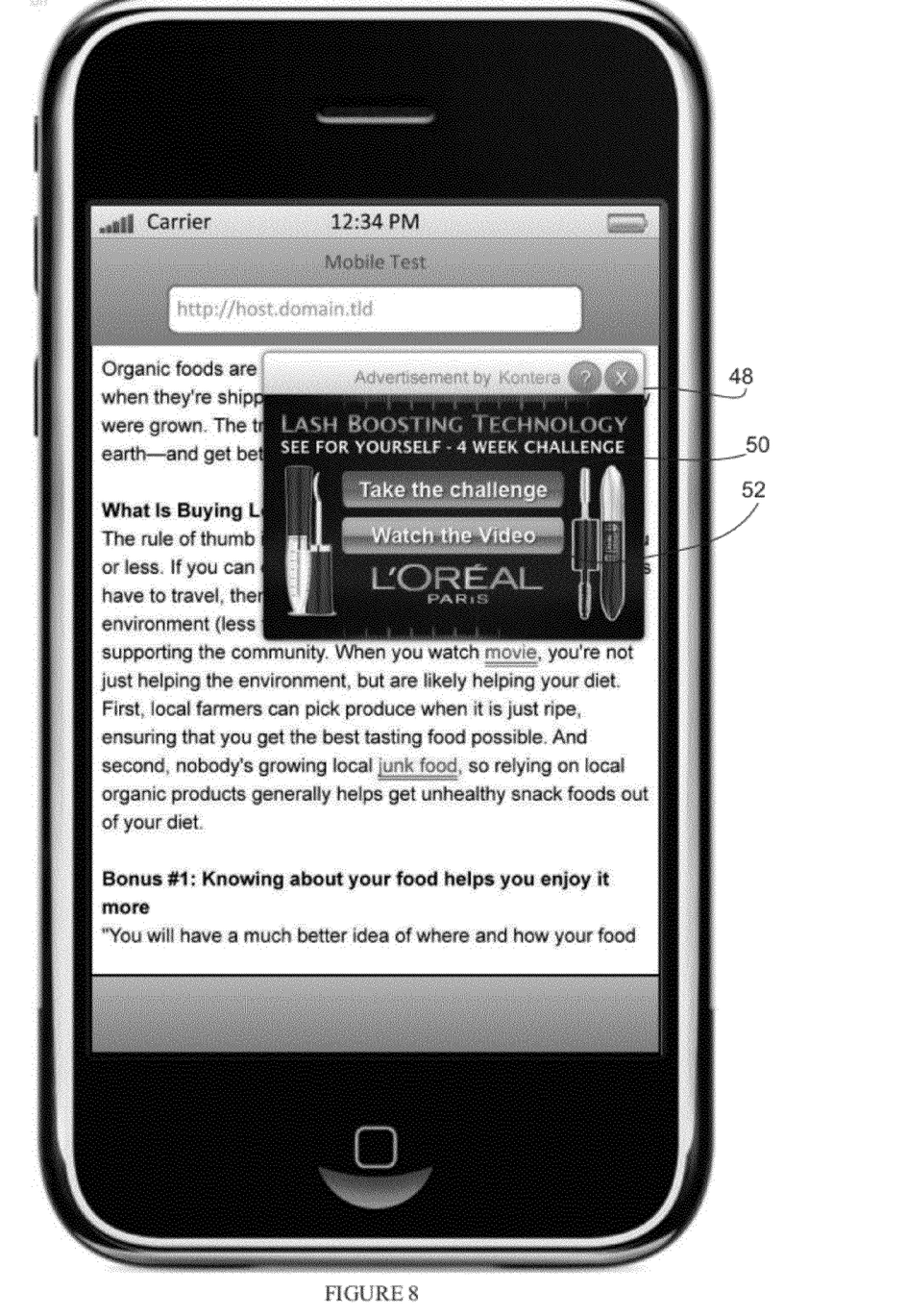

In yet another example, the content box 48 shown in FIG. 8 includes a first button 50 that operates as a link to an external web page, or some other externally hosted content, and a second button 52, which, when tapped, causes a video to be presented. Accordingly, tapping the button with reference number 50 will cause a new web page to be requested, processed and displayed. Tapping the button with reference number 52 will cause a video to be streamed to and presented at the mobile computing device.

Figure 9:
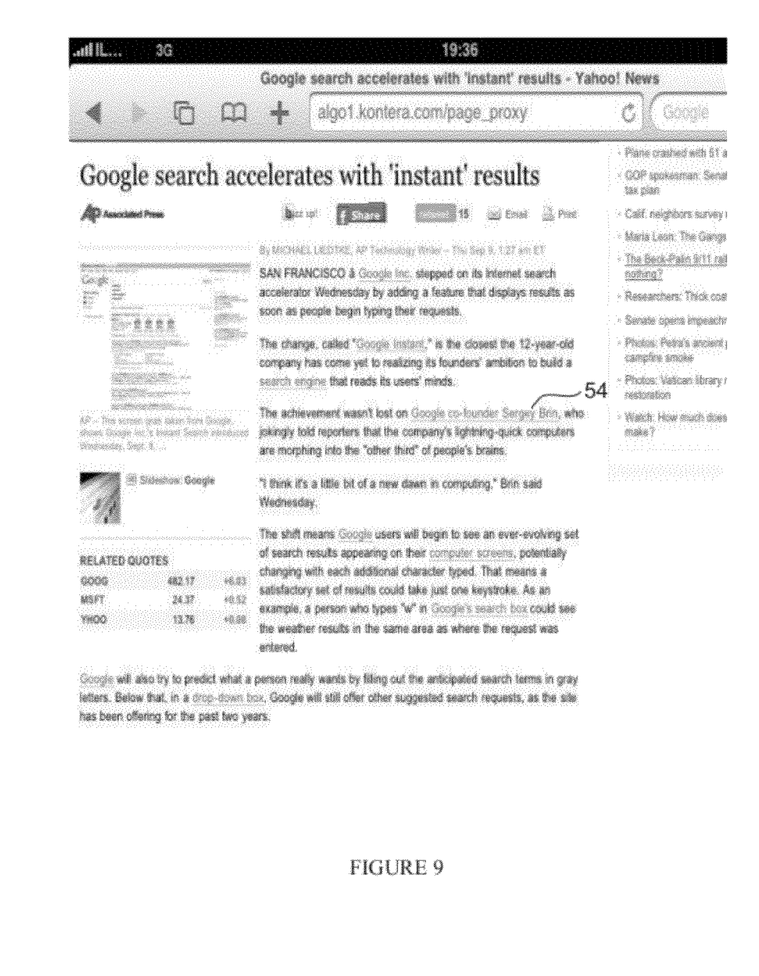
FIGS. 9 through 12 illustrate yet another set of example UIs for a mobile computing device, where the UIs are presenting augmented, contextually relevant content, according to an embodiment.
Figure 10:
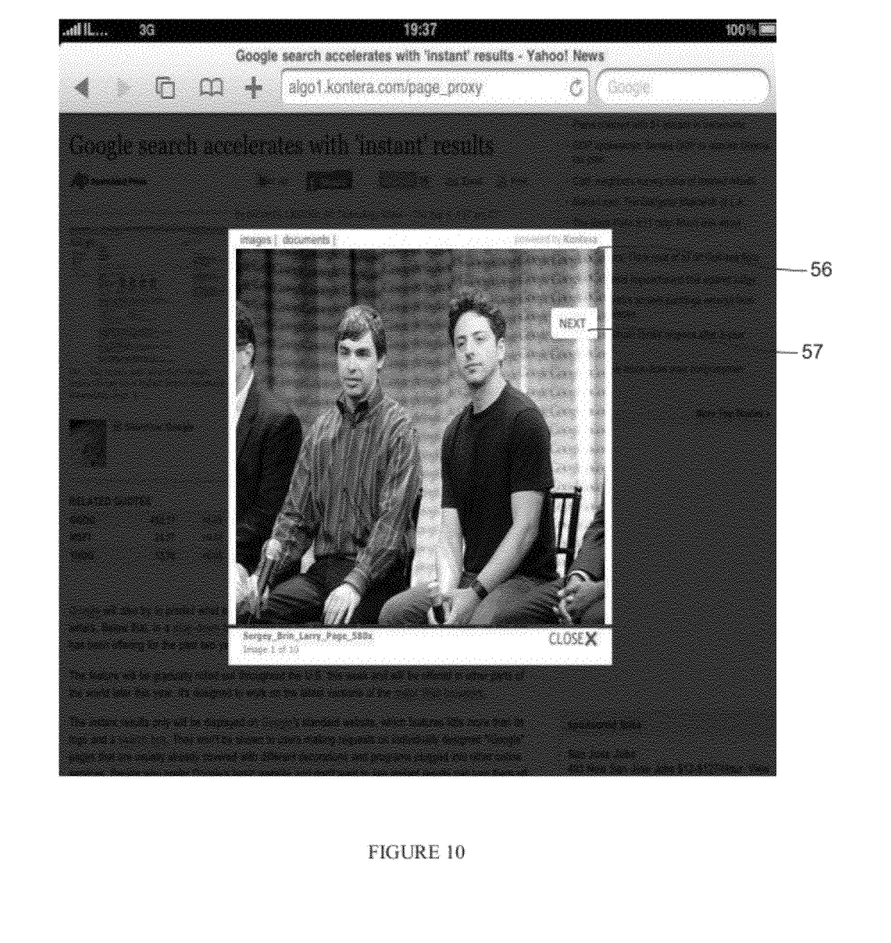
Figure 11:
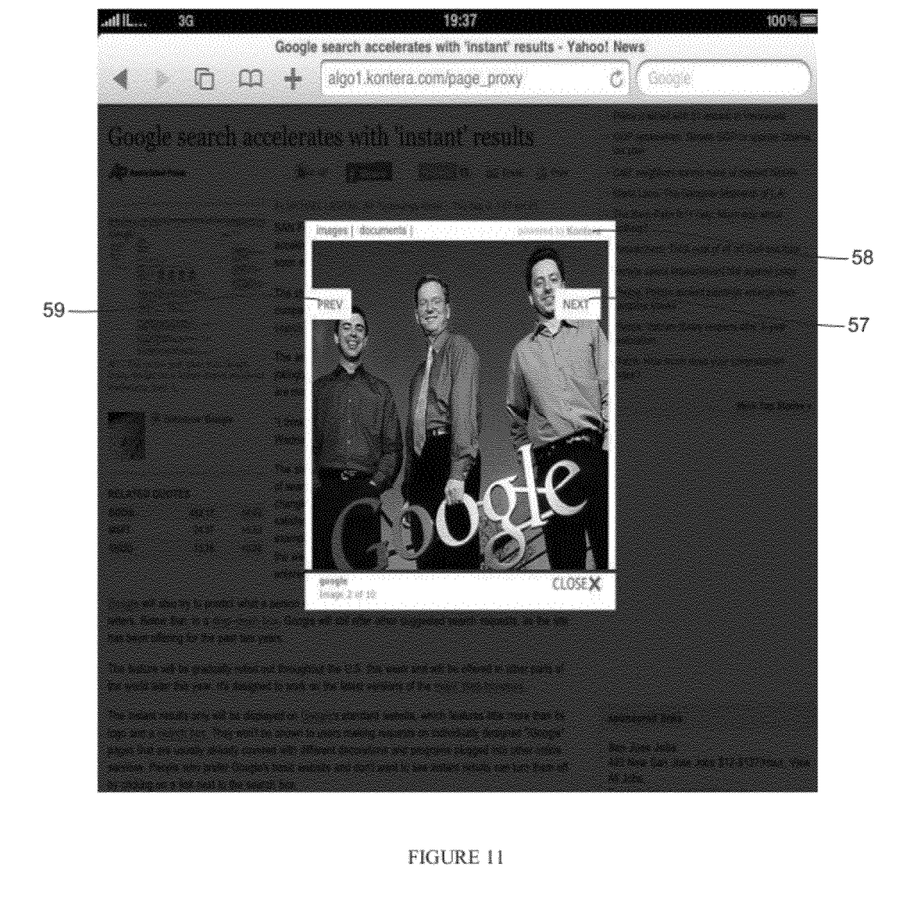
Figure 12:
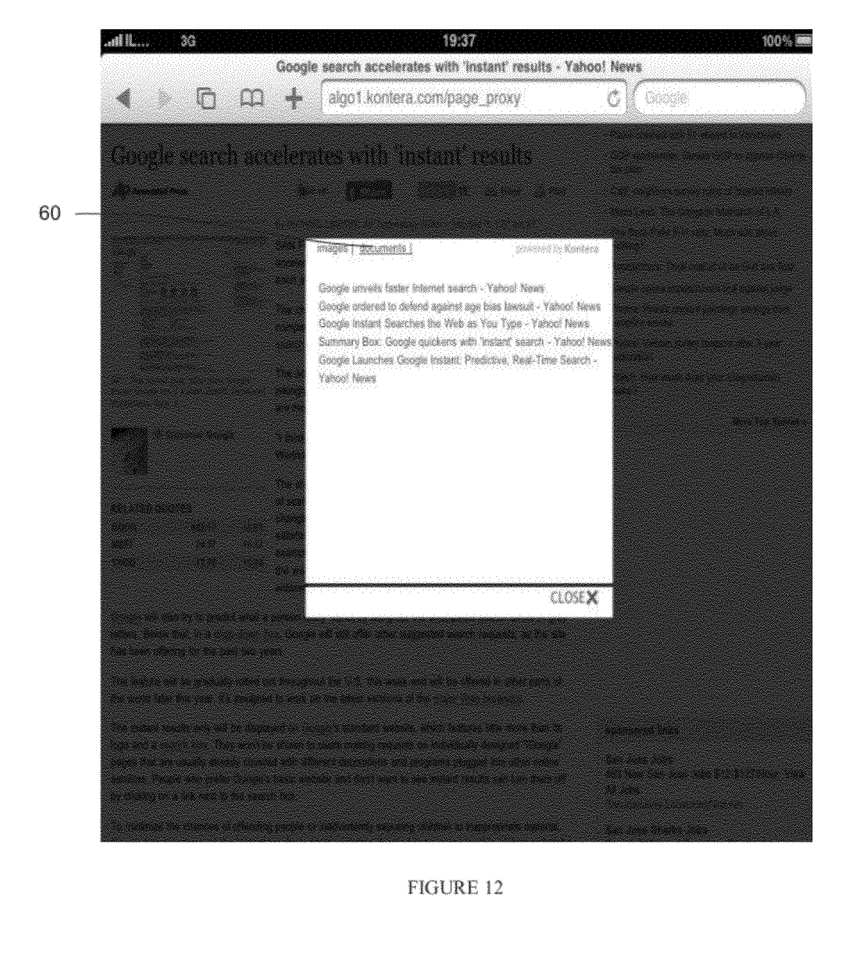

FIGS. 9 through 12 show another set of example user interfaces for displaying content meant to augment some primary content displayed on a mobile computing device, according to some embodiments. As illustrated in FIG. 9, a web page is shown with several keywords converted to hypertext links by a contextual content server. These keywords have been selected for conversion to hyperlinks by the contextual content server because the words have been determined to represent topics to which the overall subject matter of the content relates. The various algorithms for selecting the keywords for conversion to hyperlinks is described in greater detail in the '854 Application. When a user taps a hyperlink, such as the text, "Google co-founder Sergey Brin" with reference number 54, the page (e.g., primary content) is grayed out, and a content box 56 is presented, as illustrated in FIG. 10. In this particular example, the content includes a photograph or image of the very person whose name appears in the hyperlink. From this content box 56, the end-user can navigate forward and back by pressing buttons labeled, for example, with "next" 57 and "previous" 59 For instance, by selecting the "next" button shown in FIG. 10, the end-user may be presented with another image, such as that illustrated in the content box 58 shown in FIG. 11.

In addition to showing images, some additional text may be displayed in the content box. Moreover, in the examples presented, at the top of the content box are two textual buttons (e.g., Images and Documents) representing tabs, allowing the end-user to toggle back and forth between relevant images and relevant documents. As such, by selecting the documents tab 60, the content in the content box changes from relevant images to links to relevant documents, as illustrated in the example illustrated in FIG. 12.

It will be appreciated by skilled artisans that the content that is presented in the various content boxes displayed in the example user interfaces shown in the Figures may include text, images, photographs, graphics, as well as dynamic content including video and/or audio content, and dynamic graphics.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 13:
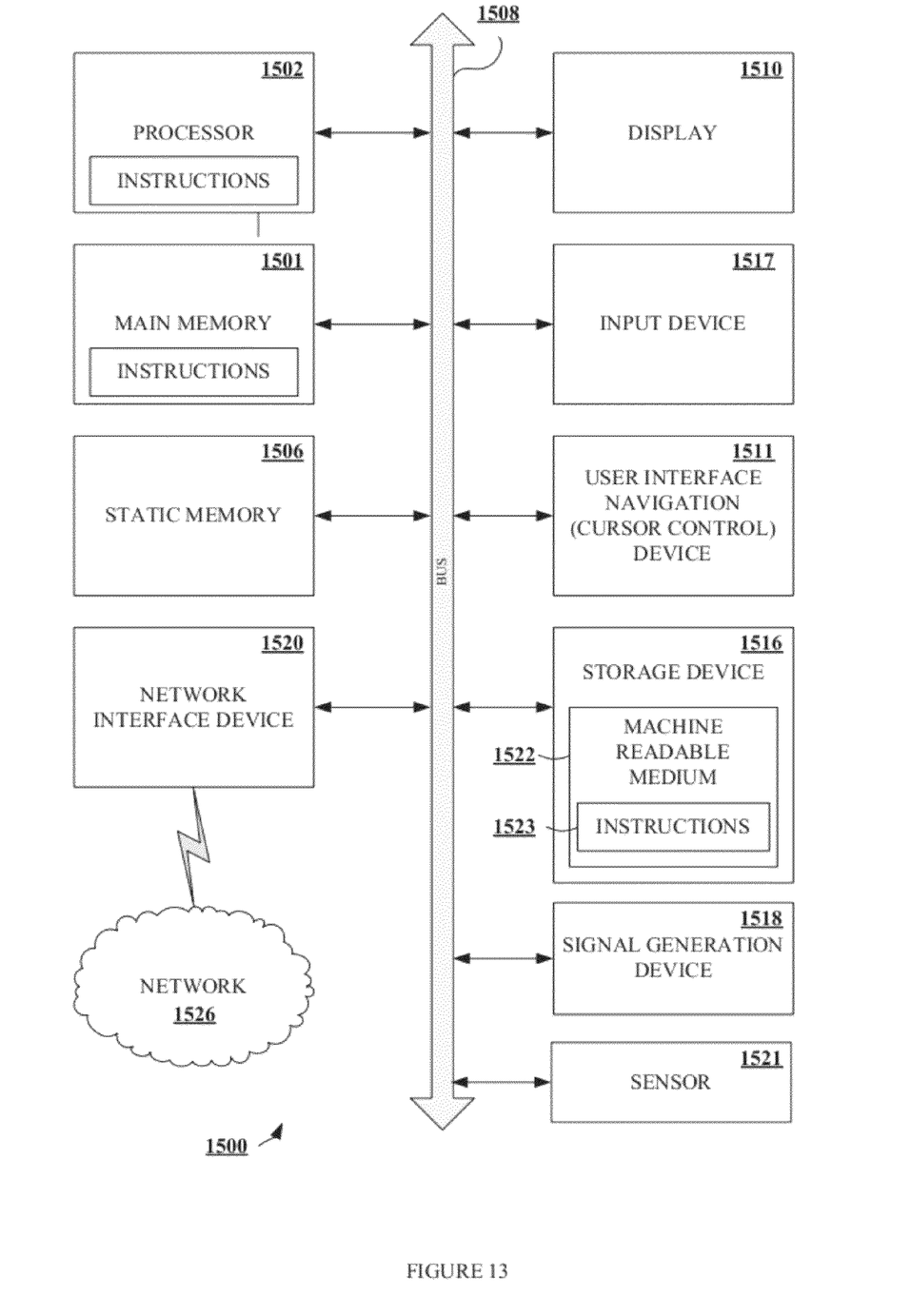
FIG. 13 is a block diagram of a machine in the form of a computer system (e.g., a contextual content server) within which a set of instructions, for causing the machine to perform any one or more of the methodologies discussed herein, may be executed.

FIG. 13 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device (e.g., drive unit 1516), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

What is claimed is:

1. A method comprising:
    receiving, at a mobile computing device having a touch screen display, web content including an embedded tag;
    displaying the web content with the touch screen display of the mobile computing device, the web content including one or more portions of text;
    processing the embedded tag embedded with the web content; and
    as a result of processing the tag:
        generating and sending a content request to a contextual content server, the content request specifying characteristics of the mobile computing device on which the web content is being displayed;
        receiving content modification instructions from the contextual content server, the content modification instructions generated based at least in part on the characteristics of the mobile computing device as specified in the content request;
        converting one or more words and/or phrases in the text of the web content to interactive links;
        detecting a first selection of an interactive link via the touch screen display;
        responsive to detecting the first selection of the interactive link via the touch screen display, modifying presentation of the web content via the touch screen display by displaying a content box, overlaying the web content, the content box including a first user interface element that, when selected via the touch screen display, causes i) a content request to be communicated to a content server, ii) content to be received from the content server, and iii) the received content to be presented within the content box, and the content box including a second user interface element that, when selected via the touch screen display, dismisses the content box so that the web content is presented without the overlaid content box;
        detecting a second selection of the interactive link via the touch screen display; and
        responsive to detecting the second selection of the interactive link via the touch screen display, modifying presentation of the web content via the touch screen display by removing the content box.

2. The method of claim 1, wherein removing the content box comprises closing the content box.

3. The method of claim 1, wherein removing the content box comprises hiding the content box.

* * * * *